United States Patent [19]

Leoni et al.

[11] Patent Number: 4,914,162

[45] Date of Patent: Apr. 3, 1990

[54] ADHESIVE COMPOSITION COMPRISING THERMOPLASTIC POLYAMIDE FROM DIMER ACID AND N-SUBSTITUTED ALIPHATIC DIAMINE

[75] Inventors: Roberto Leoni, Milan, Italy; Werner Gruber, Korschenbroich; Juergen Wichelhaus, Wuppertal, both of Fed. Rep. of Germany

[73] Assignee: Henkel Kommanditgesellschaft auf Aktien, Duesseldorf, Fed. Rep. of Germany

[21] Appl. No.: 265,172

[22] Filed: Oct. 31, 1988

Related U.S. Application Data

[60] Division of Ser. No. 33,429, Apr. 1, 1987, Pat. No. 4,810,772, which is a continuation-in-part of Ser. No. 905,728, Sep. 8, 1986, abandoned.

[30] Foreign Application Priority Data

Oct. 7, 1985 [DE] Fed. Rep. of Germany ....... 3535732

[51] Int. Cl.$^4$ .............................................. C08L 77/08
[52] U.S. Cl. .................... 525/420.5; 524/606; 524/607; 525/178; 525/184; 525/420; 528/339.3
[58] Field of Search .................. 525/420.5, 420, 178, 525/184; 528/339.3; 524/606, 607

[56] References Cited

U.S. PATENT DOCUMENTS 4,399,258  8/1983  Hinze et al. ...................... 525/420.5
4,810,772  3/1989  Leoni et al. ...................... 528/339.3

OTHER PUBLICATIONS

Wiley, John & Sons, Encyclopedia of Polymer Science and Engineering, vol. 10, Molecular Weight Determination to Pentadiene Polymers, New York, 1987, p. 4.

Primary Examiner—Harold D. Anderson
Attorney, Agent, or Firm—Ernest G. Szoke; Wayne C. Jaeschke; Henry E. Millson, Jr.

[57] ABSTRACT

Thermoplastic polyamide mixtures of polyamides based on dimerized fatty acids in which at least one polyamide contains as an incorporated unit (a) a $C_2$–$C_{10}$ aliphatic diamine capable of diamide formation, which is N-substituted with $C_{10}$–$C_{25}$-alkyl, and (b) a $C_2$–$C_{40}$-diamine capable of diamide formation comprising a diprimary amine, a heterocyclic amine, or a diomine containing one or two secondary amino groups and which is N-C$_1$–C$_8$-alkyl-substituted on at least one side.

16 Claims, No Drawings

ADHESIVE COMPOSITION COMPRISING THERMOPLASTIC POLYAMIDE FROM DIMER ACID AND N-SUBSTITUTED ALIPHATIC DIAMINE

This appklication is a division of application Ser. No. 033,429, filed Apr. 1, 1987, now U.S. Pat. No. 4,810,772, which is a continuation-in-part of Ser. No. 905,728, filed Sept. 8, 1986, now abandoned.

BACKGROUND OF THE INVENTION

1. Field of the Invention

This invention relates to a hotmelt adhesive composition containing a polyamide based on dimeric fatty acids and, optionally, a second polyamide and/or polyethylene.

2. Description of Related Art

Hotmelt adhesives are becoming increasingly important in the adhesives field. These adhesives are advantageous since they reach necessary bond strength by cooling from the melt and, as such, are suitable for high-speed production operations. A further advantage resides in the fact that equipment for protection against solvent vapors is unnecessary. Moreover, the prolonged drying times of aqueous adhesives are substantially shortened when hotmelts are used.

An important class of hotmelts are the polyamides. Of these, polyamides based on dimerized fatty acids have acquired particular significance. Among the polyamides based on dimerized fatty acids, those containing dimerized fatty acids in the acid component and ether diamines in the amine component are particularly important as a result of their favorable low-temperature properties.

Thus, for example, German Application no. 27 54 233 describes copolyamide resins which contain in the acid portion of the molecule a special mixture of polymeric fatty acids (dimer fatty acids) and aliphatic dicarboxylic acids containing from 6 to 12 carbon atoms and, on the base side, a mixture of saturated aliphatic diamines and polyoxyalkylene diamines. These products have an embrittlement temperature of $-25°$ C.

Similar resins are described in U.S. Pat. No. 4,218,351 which relates to polyamides containing, in addition to the usual raw materials, from 5 to 30 mole percent dimer fatty acid and from 0.25 to 12.5 mole percent oligomers containing amino groups (polyoxyalkylene diamines).

A polyamide mixture is described in German Patent Application no. 31 11 206, according to which a polyamide based on dimerized fatty acids and polyether diamines is mixed with a second polyamide based on dimerized fatty acids and aliphatic amines or cycloaliphatic amines containing from 2 to 40 carbon atoms in the carbon chain, free from hetero atoms.

Although products of the above type show a favorable spectrum of properties, it is still desirable to improve the substrate adhesion, particularly to difficult substrates. The need exists to improve the peel strength of bonded assemblies obtained with hotmelt mixtures such as these, while, at the same time, retaining their favorable low-temperature properties.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to hotmelt compositions containing:
 (A) a thermoplastic polyamide I; and, optionally,
 (B) thermoplastic polyamide II (both (A) and (B) being based on dimerized fatty acids); and/or
 (C) wax-like polyethylene having a molecular weight of from 250 to 8,000; and/or
 (D) standard hotmelt adhesive auxiliaries.

The preferred hotmelt compositions of the invention contain:
 (A) from 10 to 90% by weight polyamide I,
 (B) from 10 to 90% by weight polyamide II,
 (C) from 0 to 20% by weight polyethylene and
 (D) from 0 to 20% by weight of standard hotmelt adhesive auxiliaries.

The above percentages by weight are based on the weight of the hotmelt composition.

Particulary preferred products contain:
 (A) from 40 to 60% by weight polyamide I,
 (B) from 40 to 60% by weight polyamide II,
 (C) from 5 to 20% by weight polyethylene and
 (D) from 0 to 10% by weight of standard hotmelt adhesive auxiliaries.

In (A) above, polyamide I consists of:
 (a) from 10 to 50, preferably from 25 to 50 mole percent of at least one dimer fatty acid;
 (b) from 25 to 45 mole percent of at least one aliphatic, aromatic or cyclic diamine containing from 2 to about 40 carbon atoms, said diamines including diprimary diamines, diamines containing secondary amino groups and alkyl substituents with from 1 to 8 carbon atoms on the nitrogen atom, and/or heterocyclic diamines capable of diamide formation;
 (c) from 5 to 25 mole percent of at least one aliphatic diamine, having from 2 to about 10 carbon atoms, being capable of diamide formation, and being substituted on one or both N-atoms with an alkyl group having from about 10 to about 25 carbon atoms in a linear or branched chain; and
 (d) from 0 to 40, perferably 0 to 25 mole percent of at least one aliphatic dicarboxylic acid containing from about 6 to about 22 carbon atoms.

The polyamides I and II used in the hotmelt adhesive compositions of the invention are condensates of an acid component and an amine component.

The polyamides I used in accordance with the invention are the subject of copending application Ser. No. 905,729 now abandoned, filed of even date herewith, entitled POLYAMIDE RESINS", which is expressly incorporated herein by reference.

The essential constituent of the acid portion of the polyamides I is component (a) above, the dimer fatty acid. The expression dimer fatty acid denotes products having the dimerization product of one or more unsaturated fatty acids as the principal constituent thereof. Dimer fatty acids are well known in the polyamide art. They are products which typically exist as mixtures. For example, dimer fatty acids normally contain a percentage of trimer fatty acids and a percentage of monofunctional fatty acids. Dimer fatty acids which are suitable for the purposes of this invention are those containing from 10 to 20 mole percent of trimer fatty acid. The monomeric fatty acid content should be below 25% by weight, preferably below 10% by weight and more preferably below 5% by weight. In this connection, it is known that an excessive content of trimer fatty acid can lead to gelation of the polyamide. Gelation may be partly offset by the the addition of chain terminators, such as monofunctional fatty acids or monofunctional amines. The use of such chain terminators in this context will be quite obvious to persons skilled in the art.

Dimer fatty acids obtained by dimerization of $C_{18}$ fatty acids, and containing 36 carbons, are particularly well suited for use in the practice of this invention. However, dimer fatty acids having shorter or longer carbon chains can also be used herein.

The polyamides I may contain aliphatic $C_6$–$C_{22}$ dicarboxylic acids, i.e. component (d), as a further optional acid component. Such dicarboxylic acids are preferably saturated dicarboxylic acids having a carbon chain length of from 6 to 12 carbon atoms, and, more preferably, they are linear dicarboxylic acids containing terminal carboxyl groups. Thus, adipic acid, heptane dicarboxylic acid, octane dicarboxylic acid, azelaic acid, nonane dicarboxylic acid, sebacic acid, undecane dicarboxylic acid, dodecane dicarboxylic acid and/or brassylic acid, and also higher homologs of the foregoing are particularly suitable. The type and/or quantity of dicarboxylic acids used will be determined, in part, from the properties desired in the polyamide. Where it is desired to use polyamides I having a relatively low melting point, very small amounts, if any, of aliphatic $C_6$–$C_{22}$ dicarboxylic acids will be employed. Where polyamides having high melting points are required, larger amounts of these dicarboxylic acids, particularly the shorter-chain types, for example adipic acid, within the molar limits indicated herein, should be used. The same criteria for $C_6$–$C_{22}$ dicarboxylic acid content also apply with respect to polyamides II, the compositions of which will be discussed in detail below.

The polyamides I contain as amine component (b) from 25 to 45 mole percent of aliphatic, aromatic and/or cyclic $C_2$–$C_{40}$ diamines. These diamines are diprimary diamines, diamines containing one or two secondary amino groups having an alkyl substituent with no more than 8 carbon atoms on the N-atom, and/or heterocyclic diamines capable of diamide formation. Diamines having a carbon chain of from 2 to 20 carbon atoms are preferred. Lower straight-chain or branched-chain aliphatic or monocyclic diprimary diamines and monocyclic, heterocyclic diamines are particularly preferred for use herein. The diamines suitable for use as component (b) in the preparation of polyamides I can be divided into various groups. Diprimary aliphatic diamines containing terminal amino groups are of considerable importance for use herein. Of these, those amines which correspond in their carbon skeleton to the abovementioned dicarboxylic acids, including dimer fatty acids, and to the shorter-chain homologs thereof, are preferably employed. Thus, diamines such as ethylenediamine, propylenediamine, hexamethylenediamine, and homologs thereof, as well as dimer fatty diamines (obtained by conversion of dimer fatty acids into the dinitriles and subsequent hydrogenation of the two nitrile groups) are of significant importance. Another important group of diamines which can be used are aromatic diamines. Suitable aromatic diamines are those derived from benzene, toluene or otherwise substituted benzene-based aromatics, for example 2,6-tolylene diamine, 4,4'-diphenylmethanediamine and/or xylylenediamine. The corresponding cyclohexane derivatives may also be used.

Another class of diamines which may be used in the preparation of polyamides I are diamines containing one or two secondary amino groups having a $C_1$–$C_8$ alkyl substituent attached to one or both N-atoms. Diamines such as these are derived from the diprimary aliphatic diamines discussed above. The $C_1$–$C_8$ alkyl group is a short-chain alkyl group, preferably an alkyl group containing 1 to 3 carbon atoms such as methyl, ethyl or propyl.

Another group of diamines which may be used in the polyamides I are heterocyclic diamines capable of diamide formation, preferably aliphatic heterocycles. The most important representative of this group is piperazine.

The polyamides I contain as their most important constituent component (c), i.e. from 5 to 25 mole percent of at least one straight or branched-chain aliphatic diamine, capable of diamide formation, which contains from 2 to about 10 carbon atoms and which has one or two N-alkyl groups in which the alkyl group has from about 10 to about 25 carbon atoms. These amines can be derived from the aliphatic diprimary diamines discussed above. These diamines are preferably unbranched, and are preferably ethylenediamine, propylenediamine, tetramethylenediamine, pentamethylenediamine, hexamethylenediamine, or higher homologs thereof, which contain a $C_{10}$–$C_{25}$ alkyl group on at least one of the N-atoms.

The alkyl group which is substituted on at least one of the N-atoms contains from 10 to 25 carbon atoms and may be linear, branched or cyclic, with straight-chain alkyl groups being preferred. Among the straight-chain alkyls, those containing an even number of carbon atoms are most preferred. The aliphatic diamines capable of diamide formation and N-alkyl-substituted on at least one side may be used in the form of discrete individual compounds. However, it is preferred to use mixtures. Thus, products in which the N-alkyl group has a chain length and chain length distribution similar to that of a hydrogenated fatty acid mixture are preferred. Particularly preferred N-alkyl-substituted aliphatic diamines contain N-alkyl substituents of which the chain length corresponds to that of a hydrogenated tallow fatty acid or hydrogenated tail oil fatty acid.

Polyamides I and II may contain acid components and amine components in stoichiometric quantities. For use as hotmelts, however, it is desirable, in the majority of application, that residual amino groups or residual acid groups be present. To achieve this, an excess of acid or base, which makes up no more than 10 equivalent percent of all functional groups will be used. Base-terminated resins have amine numbers of up to about 50, preferably from 2 to 20 and more preferably from 2 to 15. Acid-terminated resins should have an acid number of up to about 20 and preferably from 2 to 10.

The polyamides II used as component (B) in the hot-melt mixtures of this invention can be selected from known polyamides containing dimer fatty acid. Products consisting of the following components are preferred:

(a) from 20 to 55 mole percent of at least one dimer fatty acid, (b) from 0 to 25 mole percent aliphatic $C_6$–$C_{22}$ dicarboxylic acid, (c) from 0 to 30 mole percent aminocarboxylic acid and/or its lactam, containing from 6 to 22 carbon atoms, (d) from 20 to 55 mole percent of at least one aliphatic, aromatic, and/or cyclic $C_2$–$C_{40}$ diamine. Suitable diamines include diprimary diamines, diamines containing secondary amino groups and alkyl substituents with from 1 to 8 carbon atoms on the N-atom, and/or heterocyclic diamines capable of diamide formation, and (e) from 0 to 30 mole percent polyether diamine.

The dimer fatty acids, dicarboxylic acids and aliphatic, aromatic and/or cyclic $C_2$–$C_{40}$ diamines, i.e., the diprimary diamines, diamines containing secondary amino groups and alkyl substituents with no more than 8 carbon atoms on the N-atom and/or the heterocyclic diamines capable of diamide formation, which are used in the polyamide resins II, correspond to the compounds used in the polyamides I.

In addition, the polyamides II may contain from 0 to 30 mole percent aminocarboxylic acids (component c)). Preferred aminocarboxylic acids are aminocarboxylic acids containing terminal functional groups, among which products which contain from 6 to 20 carbon atoms, particularly in an unbranched chain, are especially preferred. Such aminocarboxylic acids include 6-aminocaproic acid, 11-aminoundecanoic acid, 12-amino-lauric acid and higher homologs thereof. The foregoing are preferred for use herein. These aminocarboxylic acids can also be used in the form of their lactams.

In addition to the amine component (d), the polyamides II may optionally also contain polyether diamines, component (e). The polyether diamines can be used in quantities of up to 30 mole percent. Suitable polyether diamines are those containing terminal primary amino groups situated on a $C_2$–$C_6$ alkyl group, the alkyl groups being joined to one another by a polyether chain having a molecular weight of from about 100 to about 5000 and preferably from about 300 to about 2000. The polyether chain may be derived from ethylene oxide, propylene oxide, butent-1-oxide, or tetrahydrofuran. Polyether diamines based on polypropylene oxide are preferred.

In the practice of the invention, acid-terminated, as well as amino-terminated, polyamides I and polyamides II may be mixed with one another. However, to avoid a build-up of viscosity during processing in the melt, it is preferred to mix polyamides I and polyamides II having the same type of terminal groups.

The polyamide resins I and II used herein have a molecular weight (number average) of from about 5,000 to about 15,000 and preferably from about 8,000 to about 12,000. In order to obtain high molecular weights, the acid and base components are used in substantially equivalent quantities. To achieve low molecular weights, one of the components may be used in excess. Another method of reducing molecular weight is to add chain terminators, such as monofunctional fatty acids or monofunctional amines. On the other hand, the molecular weight may be increased by in the presence of a certain percentage of trifunctional components, for example trimer fatty acid.

The hotmelt mixtures according to the invention may contain polyethylene (component (C)) as a further constituent. The polyethylenes preferred for use herein are low molecular weight, wax-like polyethylenes which have a number average molecular weight within the range of from about 250 to about 8,000. It is possible to use linear or branched polyethylene providing they have a wax-like character. Oxidized polyethylenes having an acid number through terminal carboxyl groups are also suitable. Mixtures of polyethylenes with paraffin waxes can also be used. The melting point of the mixture can be employed as the selection criterion. It has been found that products having melting points within the range of from 80° C. to 115° C. and preferably within the range of from 90° C. to 110° C., are fully suited for use herein. However, products melting at a temperature of about 106° C. have proved particularly effective.

The hotmelt mixtures according to the invention may also contain well known conventional auxiliaries (component (D)), primarily compatibility promoters. Particularly suitable for such use are esters of fatty acids, particularly fatty acid esters with primary alcohols such as methanol, ethanol and the like.

It may also be desirable to use plasticizers in the mixtures. Suitable plasticizers are compounds based on phthalic acid esters, epoxide plasticizers, polyester plasticizers or the phosphoric acid triesters which are commonly used as plasticizers. Organic solvents may also be employed. In other embodiments of the invention, compounds which are well known and widely recognized as tackifiers can be employed. The auxiliaries mentioned are generally used in quantities of no more than 20% by weight, based on the compatible mixtures as a whole. In many cases, however, quantities of from 2 to 8% by weight, and, more especially, from 3 to 5% by weight, are sufficient for use herein.

In addition to the constituents mentioned above, the compatible mixtures according to the invention may contain other auxiliaries of the type commonly used in adhesives. Thus, they may contain stabilizers to protect against degradation by light and heat (antiagers), for example antioxidants, organic or inorganic fillers, pigments, preservatives or fungicides in small amounts. These additives are normally added in quantities of from 0.05 to 2% by weight.

The compatible polymer mixtures of this invention may be prepared in two ways. In a first method, the starting components may be heated together, at a temperature above their melting point and mixed in the desired ratios simply by stirring, preferably after mechanical size reduction. In a second method of preparation, solutions of the starting components, for example, in aromatic solvents, such as toluene, or in DMF or similar solvents, are prepared. The solutions are mixed and the desired hotmelts are obtained therefrom by evaporation of the solvent.

The hotmelt mixtures of this invention have a softening point (as determined in accordance with ASTME-28) in the temperature range of from 60° C. to 200° C., and preferably in the range of from 80° C. to 150° C. The low-temperature properties of the mixtures are excellent. The requirements of the mandrel test (winding a test specimen measuring 200 mm × 25.4 mm for a thickness of 1 mm through 360° about a 25.4 mm diameter brass cylinder) are satisfied at −30° C. and, preferably, at −40° C. A particular advantage of the hotmelt mixtures lies in their improved substrate adhesion. The products manifested superior substrate adhesion values as compared to those of the individual components and to the products of the prior art. In particular, higher tensile shear strength values were obtained when the products of this invention were used with materials that are difficult to bond, such as PVC, polyester films or aluminum. In addition, the water uptake of the products is considerably lower than is the case with polyamide resins which do not contain any diamines without an N-alkyl group as defined in accordance with the invention.

The hotmelts of this invention are generally applied using pumps or metering systems. The melt may be kept on tap or may be obtained by melting shaped bodies, such as cylinders, filaments, wires or other profiles. Immediately after application of the liquid adhesive film, the surfaces to be bonded should be placed against one another under light pressure until the actual bond has been established.

In addition, one may dissolve the new blends in suitable solvents and apply the solutions thus obtained to the surfaces to be bonded. In that case, however, the solution is reduced to a tacky state by the application of heat. This applies in particular to instances in which one of the two surfaces to be bonded is not permeable to the solvent used. Finally, the adhesive may also be applied in the form of a suitable aqueous dispersion and the actual bonding process caried out by applying heat after evaporation of the water.

For a fuller understanding of the nature and object of this invention, refrence may be had to the following examples which are intended merely as further illustrations of the invention and are not to be construed in a limiting sense.

EXAMPLES

Polyamide I was prepared in a first step of the process. The condensation reaction was carried out under nitrogen with stirring in a tubulated glass flask. The carboxylic acids which were used were first heated to a temperature of about 60° C., following which the other reaction components were added. The contents of the flask were then heated to a temperature of about 230° C. and kept at that temperature for a period of about one hour. The flask was then evacuated to 15 mbar over the next hour at constant temperature. After cooling to 120° C., the reaction product was removed and isolated to determine its properties.

The quantities used, in grams, and the identity of the amine employed and acid numbers of the reaction product are shown in the following Table beneath the particular Example No. The Table also shows the softening point (R+B, ASTM E-28) and the flexibility values in °C. obtained at low temperatures. Flexibility was determined by the madrel test in which a test specimen measuring 20×70 mm for a thickness of 1 mm is wound through 360° about a 25.6 mm diameter brass cylinder. The tests were carried out at decreasing temperatures (test specimen and cylinder in temperature equilibrium) to find the lowest temperature at which three out of five test specimens withstood the winding test without breaking.

|  | EXAMPLES | | |
|---|---|---|---|
|  | 1(1) (grams) | 1(2) (grams) | 1(3) (grams) |
| Dimer fatty acid | 285 | 236 | 236 |
| Azelaic acid | — | 16 | 16 |
| Ethylenediamine | 24 | 24 | 18 |
| N—alkyl propylenediamine | 33.4 | 33.4 | 75.2 |
| Softening point | 100° C. | 140° C. | 120° C. |
| Amine number | 4.1 | 3.2 | 6.0 |
| Flexibility | −35° C. | −40° C. | −45° C. |

Explanation:

The N-alkyl propylenediamine (Formula I below) used contained an alkyl group "R" which corresponds to tall oil fatty acid in chain length and chain length distribution.

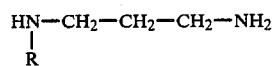

Polyamide II was prepared by the same method. The basis for polyamide I and II was a commercial dimerized $C_{18}$ fatty acid (3% by weight monomer, 96% by weight dimer, the remainder being higher polymers). To prepare polyamide II, to 100 parts by weight of this acid, there was added:

For polyamide II (1)
 8.3 parts by weight diaminoethane and
 25.7 parts by weight of dimer $C_{18}$ fatty diamine;
For polyamide II (2)
 28.0 parts by weight axelaic acid,
 5.3 parts by weight diaminoethane, and
 21.0 parts by weight piperazine.

The hotmelt mixtures were prepared by melting together and intensively stirring one of polyamide I (1) to I (3) and one or both of polyamide II (1) and II (2), and also a wax-like commercial polyethylene (softening point 106° C.).

The following tests were used for assessment of the hotmelt mixture:

1. R+B (softening point)
The softening point (°C.) was measured by the Ring-+Ball method (R+B) according to ASTM E-28.

2. Viscosity
The viscosity (mPa.s) was measured using a Brookfield type RVT Thermocel viscosimeter (SC 4–27 spindle) at 210° C.

3. Tensile shear strength
The tensile shear strength was determined in accordance with DIN 53 283:
Material: 1. aluminum: Al Cu Mg 2×platinized 4. Peel strength
Peel strength was determined by the T-peel test.
Material:
 crosslinked polyethylene
 Mylar film
 FPVC, PUR
Test Specimen:
 120×25×0.2 mm
 80 mm overlap
Pretreatment: corona treatment only with PE and Mylar
Bonding: overlapping surface coated with adhesive on one side and directly bonded.
Conditioning: 24 h at 20° C.
Temperature and test speed:
20° C. and 0° C., 100 mm cross-head speed 5. Mandrel test
A film measuring 200×25.4×1 mm is bent through 360° about at 25.4 diameter mandrel. The mandrel and the test strip are conditioned for 4 hours at the test temperature. 10 test specimens are tested in each case.

The quantities in which polyamides I and II were used are shown in the following Table, followed by the vicosities at 210° C. in mPa.s, the softening temperature R+B in °C. and the mandrel test (50% failure in °C.).

TABLE 1

| Example No. | 1 | 2 | 3 |
|---|---|---|---|
| Polyamide I (1) | 60% | — | — |
| Polyamide I (2) | — | 50% | — |
| Polyamide I (3) | — | — | 40% |
| Polyamide II (1) | 30% | 20% | — |
| Polyamide II (2) | — | 15% | 40% |

TABLE 1-continued

| Example No. | 1 | 2 | 3 |
|---|---|---|---|
| Polyethylene | 10% | 15% | 20% |
| Viscosity (mPa.s) | 4000 | 5000 | 4500 |
| Softening Point (° C.) | 97 | 98 | 108 |
| Mandrel test | −45° C. | −50° C. | −55° C. |

TABLE 2

| Example No. | 1 | 2 | 3 |
|---|---|---|---|
| Tensile shear strength Al/Al (N/mm$^2$) | 8.5 | 9.6 | 10.5 |
| Peel strength PE/PE (N/25 mm) | 180 | 250 | 200 |
| Peel Strength polyester film (Mylar) (N/25 mm) | 120 | 150 | 120 |
| Peel Strength FPVC/FPVC (N/25 mm) | 80 | 120 | 120 |
| Peel Strength PUR/PUR (N/25 mm) | 40 | 50 | 50 |

What is claimed is:

1. A hot-melt adhesive composition comprising
(A) from about 10 to about 90% by weight of at least one thermoplastic polyamide which consists essentially of the polymeric reaction product of:
   (a) from about 10 to about 50 mole percent of at least one dimer fatty acid containing from about 10 to about 20 mole percent dimer fatty acid;
   (b) from about 25 to about 45 mole percent of at least one diamine selected from the group consisting of aliphatic, aromatic and cyclic diamines having a carbon chain length of from 2 to about 40 carbon atoms and which is a diprimary diamine, a diamine containing one or two secondary amino groups having a $C_1$–$C_8$ alkyl group on the N-atom, or a heterocyclic diamine capable of diamide formation;
   (c) from about 5 to about 25 mole percent of at least one aliphatic diamine containing from 2 to about 10 carbon atoms, which is capable of diamide formation, and which has substituted on one or both N-atoms a straight or branched chain alkyl group having from about 10 to about 25 carbon atoms; and
   (d) from 0 to about 40 mole percent of at least one aliphatic dicarboxylic acid having from about 6 to about 22 carbon atoms;
(B) from about 10 to about 90% by weight of at least one polyamide which consists essentially of the polymeric reaction product of
   (a) from about 20 to about 55 mole percent of at least one dimer fatty acid,
   (b) from 0 to about 25 mole percent of an aliphatic $C_6$–$C_{22}$ dicarboxylic acid,
   (c) from 0 to about 30 mole percent of an aminocarboxylic acid, its lactam, or a mixture thereof, containing from 8 to 22 carbon atoms,
   (d) from about 20 to about 55 mole percent of at least one diamine selected from the group consisting of aliphatic, and cyclic $C_2$–$C_{40}$ diamine, and
   (e) from 0 to 30 mole percent of a polyether diamine;
(C) from 0 to about 20% by weight of polyethylene having a number average molecular weight in the range of from about 250 to about 8000; and
(D) from 0 to about 20% by weight of standard hot-melt auxiliary materials.

2. The hot-melt adhesive composition of claim 1 comprising the following quantities of components:
(A) from about 40 to about 60 percent;
(B) from about 40 to about 60 percent;
(C) from about 5 to about 20 percent; and
(D) from 1 to about 10 percent.

3. The hotmelt adhesive composition of claim 1 wherein component (A) is a carboxylic acid-terminated resin having an acid excess of up to 10 equivalent percent of all functional groups, said carboxylic acid-terminated resin having an acid number of up to 20.

4. The hotmelt adhesive composition of claim 3 wherein the acid number of the resin is in the range of from about 2 to about 10.

5. The hotmelt adhesive composition of claim 1 wherein component (A) is an amine-terminated resin having an amine excess of up to 10 equivalent percent of all functional group, said amine-terminated resin having an amine number of up to 50.

6. The hotmelt adhesive composition of claim 5 wherein the amine number of component (A) resin is in the range of from about 2 to about 15.

7. The hotmelt adhesive composition of claim 1 wherein the number average molecular weight of component (A) is in the range of from about 5,000 to about 15,000.

8. The hotmelt adhesive composition of claim 7 wherein the number average molecular weight of component (A) is in the range of from about 8,000 to about 12,000.

9. The hotmelt adhesive composition of claim 1 wherein component (A) (a) additionally contains a small quantity of a monofunctional fatty acid.

10. The hotmelt adhesive composition of claim 1 wherein component (A) (d) is a saturated aliphatic dicarboxylic acid containing from 6 to about 12 carbon atoms.

11. The hotmelt adhesive composition of claim 1 wherein the at least one diamine of component (A) (b) has a carbon chain length of from 2 to 20 carbon atoms.

12. The hotmelt adhesive composition of claim 11 wherein the said at least one diamine is a lower straight- or branched-chain aliphatic or monocyclic diprimary diamine or a monocyclic heterocyclic diamine.

13. The hotmelt adhesive composition of claim 1 wherein components (B) (a) and (B) (b) are the same as components (A) (a) and (A) (b) respectively.

14. The hotmelt adhesive of claim 1 wherein component (B) (e) contains terminal primary amino groups on a $C_2$–$C_6$ alkyl group, and a polyether chain having a molecular weight of from about 100 to about 5000.

15. The hotmelt adhesive of claim 1 wherein component (B) has a number average molecular weight of from about 5,000 to about 15,000.

16. The hotmelt adhesive of claim 15 wherein component (B) has a number average molecular weight of from about 8,000 to about 12,000.

* * * * *